United States Patent [19]

Tonomura

[11] Patent Number: 4,823,257
[45] Date of Patent: Apr. 18, 1989

[54] INFORMATION PROCESSING SYSTEM HAVING SMART MEMORIES

[75] Inventor: Motonobu Tonomura, Kodaira, Japan

[73] Assignee: Hitachi, Ltd., Tokyo, Japan

[21] Appl. No.: 83,288

[22] Filed: Aug. 10, 1987

[30] Foreign Application Priority Data

Aug. 8, 1986 [JP] Japan .............................. 61-185084

[51] Int. Cl.⁴ .......................... G06F 9/44; G06F 15/16
[52] U.S. Cl. ................................................. 364/200
[58] Field of Search .............. 364/300, 200 MS File, 364/900 MS File

[56] References Cited

U.S. PATENT DOCUMENTS

| | | | |
|---|---|---|---|
| 4,309,756 | 1/1982 | Beckler | 364/300 |
| 4,642,764 | 2/1987 | Auslander et al. | 364/300 |
| 4,656,582 | 4/1987 | Chaitin et al. | 364/300 |
| 4,656,583 | 4/1987 | Auslander et al. | 364/300 |
| 4,667,290 | 5/1987 | Goss et al. | 364/300 |
| 4,747,044 | 5/1988 | Schmidt et al. | 364/200 |
| 4,773,007 | 9/1988 | Kanada et al. | 364/300 |

Primary Examiner—Gareth D. Shaw
Assistant Examiner—Kevin A. Kriess
Attorney, Agent, or Firm—Antonelli, Terry & Wands

[57] ABSTRACT

An information processing system including a host CPU and a plurality of external memories is disclosed in which each of the external memories is formed of a smart memory having a large memory capacity, a linear address arrangement and an arithmetic and logical function, and the host CPU and each smart memory are coupled by a common intermediate language. In this information processing system, the number of accesses between the host CPU and each smart memory having a large memory capacity decreases, that is, an access gap is reduced. And the host CPU and the smart memories can be coupled to one another by the common intermediate language in a unific manner, even when internal languages used in the smart memories are different from each other.

2 Claims, 4 Drawing Sheets

4,823,257

INFORMATION PROCESSING SYSTEM HAVING SMART MEMORIES

BACKGROUND OF THE INVENTION

The present invention relates to an information processing system which includes a smart memory group having an arithmetic and logical function.

Recently, the integration density of a memory chip or CPU (namely, central processing unit) chip has been increased year after year, and a high integration density, which was unattainable in the past, is now being realized. Accordingly, the information transmitting speed of the memory chip or the information processing speed of CPU chip has been greatly improved. However, the improvement in the access speed to the memory chip has been too slight to correspond to the above-mentioned improvement in integration density.

In order to solve this problem, two methods can be considered. In one of the methods, a high-speed memory is included in a host CPU chip. In a second method, a large-capacity external memory is formed of a smart memory which has a small-scale arithmetic and logical function, to act as a co-processor. According to the second method, part of the arithmetic and logical processing carried out by the host CPU chip can be distributed to the co-processor, and thus the number of accesses between the host CPU and the external memory can be reduced. In a case where the external memory is formed of a smart memory, however, it is impossible to make the function level of the co-processor (that is, the external memory) equal to the function level of the host CPU, since that circuit part of the co-processor, which is used for the arithmetic and logical processing, is far smaller in scale than a similar circuit part of the host CPU. Accordingly, there arises a problem that the host CPU and the co-processor use different instruction sets. This problem can be solved by using a subset of the instruction set of the host CPU as the instruction set of the co-processor. However, it is necessary to make the circuit scale of the co-processor for arithmetic and logical processing as small as possible, and it is required that the co-processor can be coupled to various kinds of host CPU's. Accordingly, the host CPU and the co-processor are obliged to use different instruction sets. Thus, the host CPU issues instructions to each of the co-processors in an instruction word (that is, a machine word) which is exclusively used in the co-processor, and data is transferred between the host CPU and the co-processor in the above instruction word.

A concept common to two units having different instruction sets is usually expressed by a high level language. In a case where a program written in a high level language is executed between two host CPU's having different instruction sets, the contents of the program are executed one by one, with the aid of an interpreter dedicated to each host CPU, or the program is translated by a compiler and then executed. In this case, however, it is necessary to construct the interpreter or compiler for each CPU, and it takes a long time to construct the interpreter or compiler. Further, the interpreter is slow in operation speed. In view of the above facts, an improved method shown in FIG. 1 has been devised, in which an intermediate language is used. Referring to FIG. 1, a high level language 100 is compiled by an intermediate language output compiler 101 into an intermediate language 102, and thus an intermediate language code string is formed. An intermediate language compiler (or interpreter) 120 for a CPU 121 and an intermediate language compiler (or interpreter) 130 for a CPU 131, which are usually called a code generator, are constructed to convert the intermediate language code string into two kinds of instruction code strings, each of which is exclusively used in and executed by a corresponding one of the CPU's 121 and 131. Accordingly, it is required that the intermediate language is easy to produce and can be readily converted into a desired machine word. Further, the intermediate language output compiler 101 for converting the high level language 100 into the intermediate language is written in the intermediate language, and is converted by a code generator 110 into an instruction code string, which is exclusively used in and executed by the CPU 121 or 131. According to the method shown in FIG. 1, a time necessary to construct compilers 120 and 130 for the CPU's 121 and 131 can be made as short as possible, and the instruction code string formed by each compiler can be executed at high speed. The above method using the intermediate language, however, is usually based upon an assumption that the CPU's are equal in function level to each other, and hence is not usually used between a host CPU and a co-processor, which have largely different function levels from each other.

SUMMARY OF THE INVENTION

It is an object of the present invention to provide an information processing system including a host CPU and at least two large-capacity external memories, in which system the number of accesses between the host CPU and each external memory can be reduced to decrease the access gap, and the host CPU and the external memories can be coupled to one another by a common language in a unified manner even when the external memories use different internal languages.

In order to attain the above object, according to the present invention, each of the external memories is formed of a smart memory which has a large memory capacity, a linear addressing and an arithmetic and logical function, to act as a co-processor of the host CPU, and the host CPU and the smart memories are coupled to one another by common intermediate language codes. The intermediate language codes are translated by each of the smart memories into a language (that is, a machine word) which is exclusively used in the smart memory, and then arithmetic and logical processing is carried out on the basis of the machine word. The result of the arithmetic and logical processing is translated back to intermediate language codes.

DESCRIPTION OF THE PREFERRED EMBODIMENT

Figure 1:
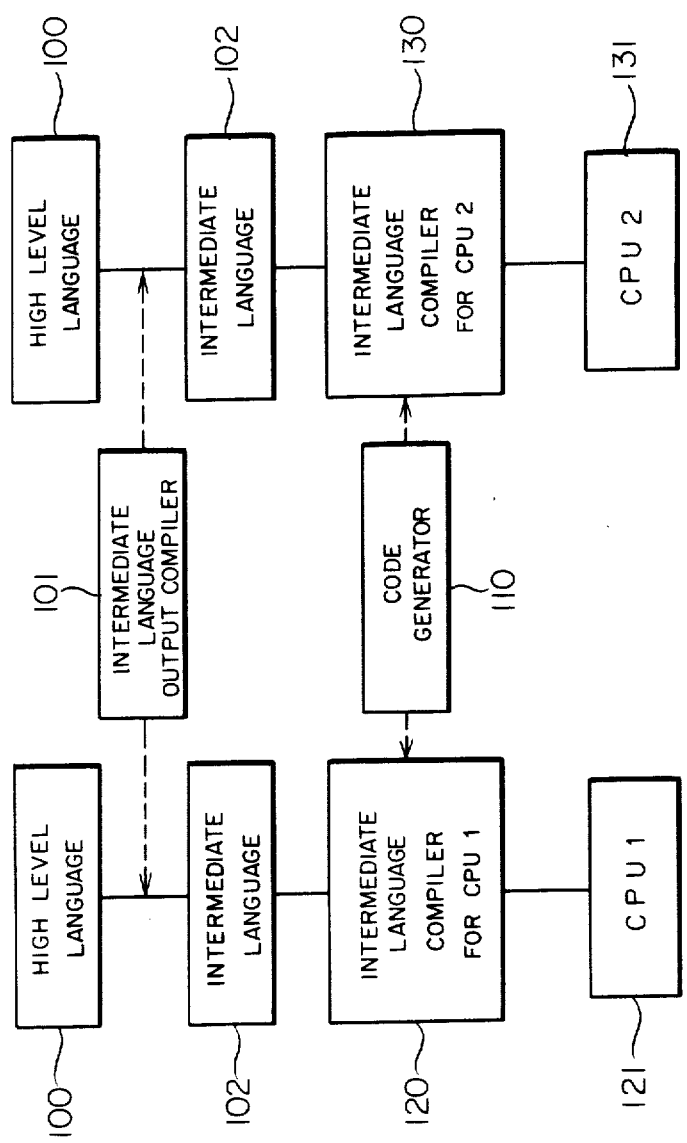
FIG. 1 is a block diagram showing a method which was proposed by the inventor prior to the present application, to operate two CPU's having different instruction sets, by a common intermediate language.
Figure 2:
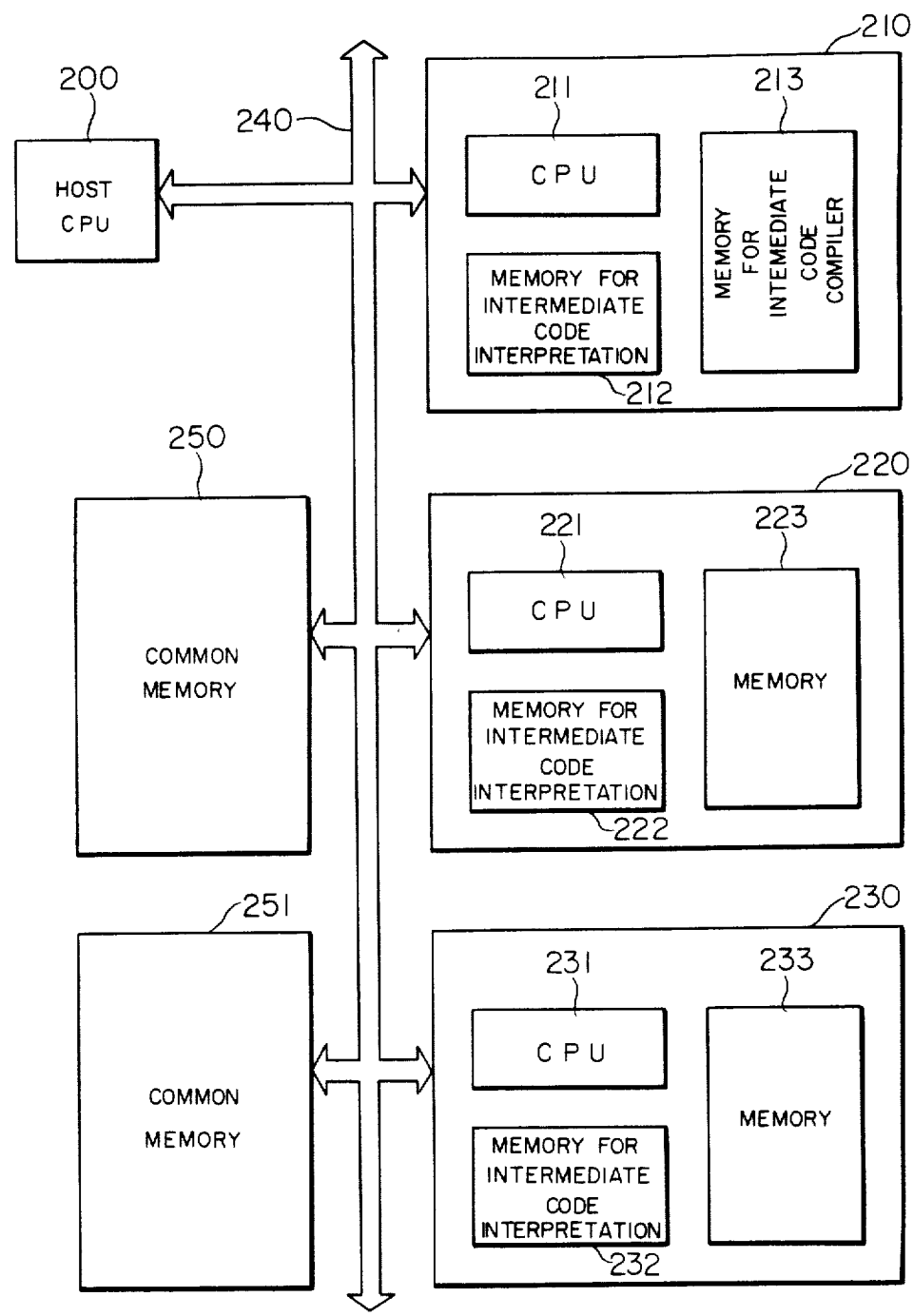
FIG. 2 is a block diagram showing an embodiment of an information processing system according to the present invention.

FIG. 2 shows an embodiment of an information processing system according to the present invention. Referring to FIG. 2, it can be used in a host CPU 200 with any instruction set and at least one of the smart memories 210, 220 and 230 is different from the remaining smart memories in the language used therein. Further, intermediate language codes having a common protocol are set between the host CPU 200 and the smart memories 210, 220 and 230, and thus the host CPU and the smart memories can have access to one another through a bus line 240.

The first characteristic feature of the present embodiment resides in that the intermediate language codes having a common protocol are set between the host CPU 200 and the smart memories 210, 220 and 230, and a high level language in the host CPU 200 is translated into intermediate language codes to allow the host CPU and the above smart memories to have access to one another through the bus line 240. The second characteristic feature of the present embodiment resides in that each of the smart memories 210, 220 and 230 includes means having a programming ability to define, interpret and set the intermediate language codes in a desired manner. The above means is greatly different from a conventional co-processor only for reinforcing an arithmetic and logical function and a cache memory controller for improving the apparent access speed to a memory. That is, intermediate code interpretation memories (namely, memories for intermediate code interpretation) 212, 222 and 232 are rewritable, to store a program for interpreting the intermediate language codes in accordance with a definition. Further, respective CPU parts 211, 221 and 231 of the smart memories 210, 220 and 230 are provided with a read only memory or means equivalent thereto, and operate to control the registration of the program into the memories 212, 222 and 232 and the deletion of the program from these memories.

Now, let us consider an example of the intermediate language codes.

The processing for performing an arithmetic operation for variables y and z and for storing the result of the arithmetic operation at the position of a variable x, is expressed by the following intermediate code string:

$$x := y \ op \ z$$

The intermediate code string is stored in one of common memories 250 and 251. The host CPU 200 issues an instruction for fetching the intermediate code string from the common memory 250 or 251 into one of the smart memories 210, 220 and 230, for example, the smart memory 220. When the intermediate code string is received by the smart memory 220, a program stored in the intermediate code interpretation memory 222 is initiated to decode the intermediate code string. The intermediate code string is first marked off in the following manner:

$$x := y \ op \ z$$

Then, it is judged that the code x indicates a variable, a code := indicates a substitution, codes y and z indicate variables, and a code op indicates an operator. Further, it is judged that at first, an arithmetic operation is to be performed for the variables y and z. For example, in a case where the code op is a code + which means addition, a program for converting this addition into a machine word is initiated, and thus the addition is expressed by the following machine word:

$$\text{ADD } y, z$$

The above addition is carried out by the smart memory 220. As mentioned above, one of programs stored in the intermediate code interpretation memory 222 is selected and initiated in accordance with the kind of the code op, to perform a desired arithmetic and logical operation. Thereafter, a program for converting the transfer of the result of the operation to the position x where the host CPU 200 can refer the above result, into a machine word, is initiated, and thus the transfer is expressed by the following machine word:

$$\text{SEND } x$$

The above transfer is carried out by the smart memory 220. The result of the operation is converted into an intermediate code, and then sent to the host CPU 200.

Figure 3:
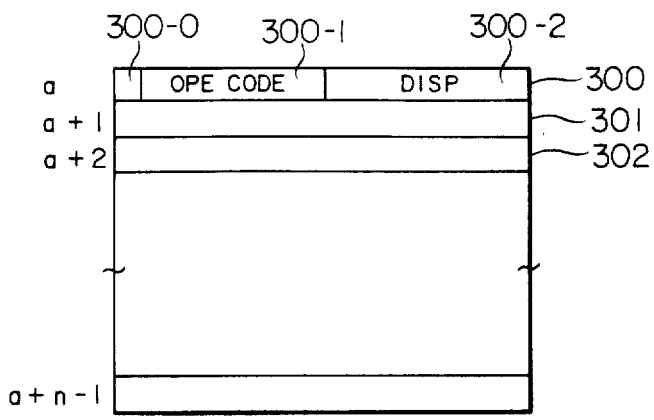
FIG. 3 is a schematic diagram showing memory locations of a smart memory which is used in the embodiment of FIG. 2.
Figure 4:
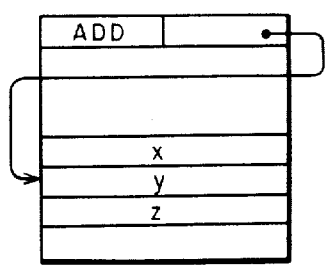
FIGS. 4a to 4c are schematic diagrams showing methods of issuing instructions directly to a smart memory which is used in the embodiment of FIG. 2.
Figure 4:
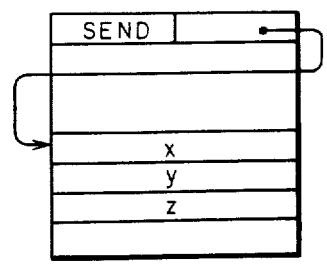
Figure 4:
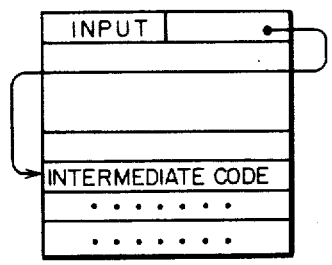

Next, an actual access method, in which the host CPU 200 has access to one of the smart memories 210, 220 and 230, will be explained below, with reference to FIG. 3. In general, when an ordinary host CPU accesses a smart memory, any special instruction or signal line is not prepared. Accordingly, the smart memories 210, 220 and 230 are required to have a function of setting a common protocol on the basis of ordinary instructions. Similarly to an ordinary memory, the whole address space of each of the smart memories 210, 220 and 230 is linearly addressed, when viewed from the host CPU 200. Thus, each smart memory can be accessed in the same manner as in the ordinary memory. Referring now to FIG. 3, in each smart memory, at least the first memory location 300 having a starting address a includes a specified bit field 300-0, an instruction field 300-1, a disp field 300-2 for indicating relative addresses a+1, a+2, and so on of memory locations 301, 302, and so on. A direct instruction to the smart memory, for example, the intermediate code string x:=y+z is expanded as shown in FIGS. 4a and 4b. The result of the arithmetic operation y+z is written in an x-region of the smart memory. The host CPU 200 (of FIG. 2) reads the above result out of the x-region, that is, the result is sent to the host CPU 200. For example, the host CPU reads the result of the operation out of the smart memory, after it has been confirmed that a specified bit is set in the specified bit field 300-1 of the memory location 300 having the starting address a. Further, an input instruction shown in FIG. 4C is used for inputting and interpreting the intermediate code string.

As mentioned above, a smart memory according to the present invention uses a program for carrying out special processing on the basis of the functions of the CPU part and the intermediate code interpretation memory in a smart memory, to carry out the special processing in accordance with the program. That is, the smart memory can perform an operation mentioned below. Incidentally, in this operation, the smart memory 210 of FIG. 2 is used as a fundamental smart memory, by way of example.

In a case where a series of processing steps are frequently used, it is preferable to perform a series of processing steps in a smart memory rather than to interpret intermediate code strings from a host CPU one by one. In this case, the smart memory 210 is specially initiated to compile a series of intermediate code strings, and the result of the compiling processing is stored in, for example, ordinary memories 223 and 233 which are included in the smart memories 220 and 230, respectively.

Further, the so-called object oriented control method can be used for the present embodiment, in which method data and the procedure for processing the data are, as one body, managed under the concept of the object, and are abstracted into one instruction word. The object orientated control method will be briefly explained, with reference to FIG. 5.

Figure 5:
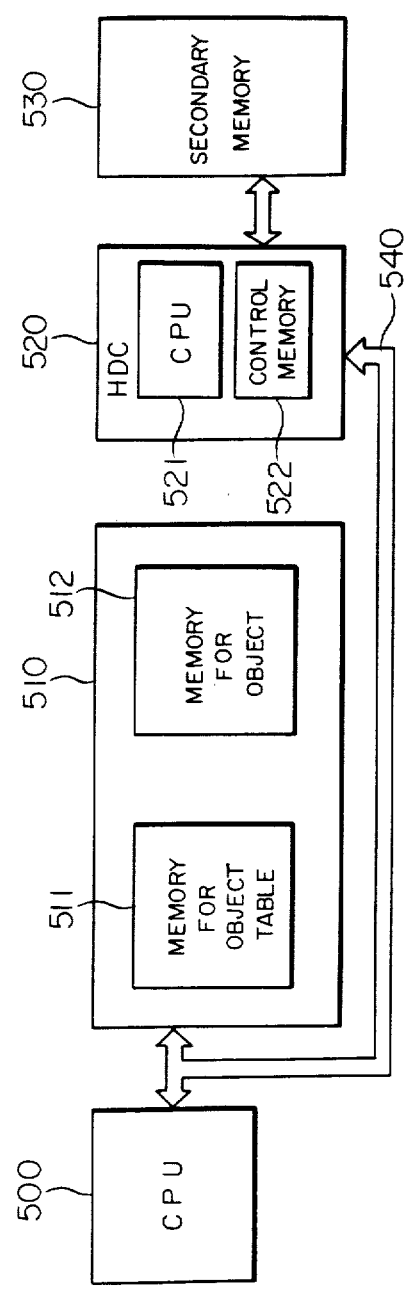
FIG. 5 is a block diagram for explaining a object oriented control method.

Referring to FIG. 5, abstract instruction words are stored in an object table memory (namely, a memory for storing an object table) 511, and the contents of the object table memory 511 indicate pointers in an object memory (namely, a memory for object) 512 which stores procedures for carrying out various objects. Let us consider a case where secondary memories 530, for example, hard discs are accessed through hard disc controllers (namely, controllers dedicated to the hard discs) 520, by way of example. In this case, respective operation procedures of the hard disc controllers are written in the object memory 512, and the hard disc controllers are operated by abstract instruction words which are included in a program. As mentioned above, according to the object oriented control method, a CPU 500 can carry out a plurality of objects on the basis of abstract instruction words, provided that operation procedures which are partially different from each other, are written into the object memory 512.

When the object oriented control method is used, the instruction field 300-1 of a smart memory shown in FIG. 3 is given an instruction code CMPL, and the contents of the disp field 300-2 indicate the relative address of a pointer indicative of a starting location of an intermediate code string which is to be compiled. At this time, an abstract instruction words for re-executing the present program is defined, to make subsequent accesses on the basis of the abstract instruction word. The abstract instruction word is stored in those regions of the intermediate code interpretation memories 212, 222 and 232 which correspond to the object table memory 511 of FIG. 5. In more detail, the instruction field 300-1 of a smart memory is given an instruction code ABST for executing an abstract instruction, and the contents of the disp field 300-2 indicate the relative address of a pointer indicative of that memory region of the object table 512 which stores the procedure for carrying out an object expressed by an abstract instruction word. Accordingly, when data having the instruction code ABST is written in the memory location 300 having the address a by the host CPU 200, an object which is given by an abstract instruction word is carried out by one of the CPU parts 211, 221 and 231 which are included in the smart memories 210, 220 and 230, respectively.

Further, according to the present invention, the access right can be transferred among the host CPU 200 and the smart memories 210, 220 and 230. Accordingly, each of the smart memories 210, 220 and 230 can access the common memories 250 and 251 at high speed, though the common memories can be accessed only by the host CPU in the prior art. Now, let us assume that a procedure written in the intermediate language is stored in the common memory 250, by way of example. When the access right to the common memory 250 is transferred from the host CPU 200 to the smart memory 210, the intermediate code compiler stored in the memory 213 of FIG. 2 is initiated, and the procedure written in the intermediate language is compiled. The result of the compiling processing is stored in the memory 223 which is included in the smart memory 220, to convert the above procedure into an abstract instruction. The subsequent accesses of the host CPU 200 to the smart memory 220 are carried out on the basis of the abstract instruction. That is, by utilizing the principle of the object oriented memory management method, a procedure which is written in the intermediate language and is used for processing an object, is rewritten in an appropriate word, to make it possible to carry out the object by a desired smart memory. Thus, the object processing procedure which has hitherto been managed and carried out under the control of the host CPU 200, can be carried out mainly under the control of the smart memory.

Further, according to the prior art, when the host CPU 200 calls a procedure which is given by modules due to module programming, the called procedure may destroy the contents of a register included in the host CPU, and thus processing for escaping or repairing the destruction is required. That is, an increased overhead is caused by the above processing. While, according to the present invention, a smart memory can carry out the whole procedure without using the register of the host CPU, and hence the processing for escaping or repairing the destruction is not required. Further, according to the present invention, complicated processing is expressed by an abstract instruction, and a smart memory can be readily accessed with the aid of a simple protocol. The smart memory can carry out the above processing, independently of the host CPU, and moreover can be made intelligent. For example, let us consider a case where the host CPU requires a smart memory to provide information on an item capable of producing a plurality of answers, the smart memory sends a plurality of answers to the host CPU, and the host CPU selects one of the answers. When the host CPU again requires the same information, the smart memory can carry out intelligent processing so that the selected answer is placed at the top of the answers, without being assisted by the host CPU.

I claim:
1. An information processing system comprising:
a host central processing unit;
at least two external memories, each of said external memories having means providing a memory function to store information and means providing an arithmetic and logical function, so that each external memory operates as a co-processor of said host central processing unit; and
bus means for coupling said two external memories to said host central processing unit;
said external memories being different from each other in at least a part of the particular internal program language used therein;
said host central processing unit operating with a high level program language and having means for converting said high level program language into an intermediate language and for transmitting said intermediate language to each external memory on said bus means; and
each of said external memories including means for interpreting said intermediate language and for converting the intermediate language into the in- ternal language used by the particular external memory.

2. An information processing system according to claim 1, further comprising at least one common memory coupled to said bus means, which can be accessed by said host central processing unit and external memories with the aid of said intermediate language.

* * * * *